United States Patent
Sandrez et al.

(10) Patent No.: US 9,654,000 B2
(45) Date of Patent: May 16, 2017

(54) BUCK CONVERTER AND METHOD OF OPERATING A BUCK CONVERTER

(71) Applicants: Pascal Sandrez, Toulouse (FR); Philippe Goyhenetche, Fonsorbes (FR)

(72) Inventors: Pascal Sandrez, Toulouse (FR); Philippe Goyhenetche, Fonsorbes (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/897,682

(22) PCT Filed: Jun. 18, 2013

(86) PCT No.: PCT/IB2013/001448
§ 371 (c)(1),
(2) Date: Dec. 11, 2015

(87) PCT Pub. No.: WO2014/203020
PCT Pub. Date: Dec. 24, 2014

(65) Prior Publication Data
US 2016/0126841 A1    May 5, 2016

(51) Int. Cl.
*H02M 3/158* (2006.01)
*H02H 7/12* (2006.01)
*H02M 1/32* (2007.01)
*H02M 1/00* (2006.01)
*H02M 3/156* (2006.01)

(52) U.S. Cl.
CPC .......... *H02M 3/158* (2013.01); *H02H 7/1213* (2013.01); *H02M 1/32* (2013.01); *H02M 2001/0025* (2013.01); *H02M 2001/0045* (2013.01); *H02M 2003/1566* (2013.01)

(58) Field of Classification Search
CPC ...................................................... H02M 3/158
See application file for complete search history.

(56) References Cited

U.S. PATENT DOCUMENTS

| | | |
|---|---|---|
| 6,552,517 B1 | 4/2003 | Ribellino et al. |
| 7,372,683 B2 | 5/2008 | Yamamura et al. |
| 2014/0277812 A1* | 9/2014 | Shih .................... G05F 1/563 700/298 |

OTHER PUBLICATIONS

International Search Report and Written Opinion correlating to PCT/IB2013/001448 issued on Mar. 24, 2014.

* cited by examiner

*Primary Examiner* — Emily P Pham
(74) *Attorney, Agent, or Firm* — Charlene R. Jacobsen

(57) ABSTRACT

A buck converter has an output node and a ground node, wherein a load is connected between the output node and the ground node and is arranged to drive an output current I_out through the output node, generating an output voltage V_out. A current control unit arranged to control the output current I_out in dependence on a control voltage V_ctl provided at a control node; and a voltage control unit arranged to provide the control voltage V_ctl. The voltage control unit comprises: an integrator unit arranged to control the control voltage V_ctl in dependence on a time integral of a difference between the output voltage and the reference voltage; at least one of an overshoot detector arranged to detect an overshoot of the output voltage V_out, and an undershoot detector arranged to detect an undershoot of the output voltage V_out.

20 Claims, 3 Drawing Sheets

BUCK CONVERTER AND METHOD OF OPERATING A BUCK CONVERTER

FIELD OF THE INVENTION

This invention relates to a buck converter and to a method of operating a buck converter.

BACKGROUND OF THE INVENTION

A buck converter is a voltage regulator for generating a regulated output voltage using a supply voltage higher than the regulated output voltage.

A buck converter may be implemented, for example, using current mode control, cf. Mark Hartman, "Inside current-mode control" in: "Power designer", No. 106. A current mode control circuit may be referred to herein as a switched mode regulator. A switched mode regulator may have a relatively low bandwidth which is limited by the switching frequency. In the case of quick load transients, this limitation may imply a drop on the output voltage value. Such a drop may, for instance, cause an unintended reset of, e.g., a digital device supplied by the switched mode regulator. Furthermore, in the event of a negative current transient, i.e., a load current decrease the current in the inductor typically included in the switched mode regulator, may flow into a capacitor creating a voltage overshoot.

An overshoot problem may notably occur when the switched mode regulator is used to supply one or more microcontrollers. In recent years, microcontrollers tended to require an ever higher current capability in a limited voltage range, to allow for higher operating frequencies. A voltage overshoot may however be destructive.

SUMMARY OF THE INVENTION

The present invention provides a buck converter and method of operating a buck converter as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
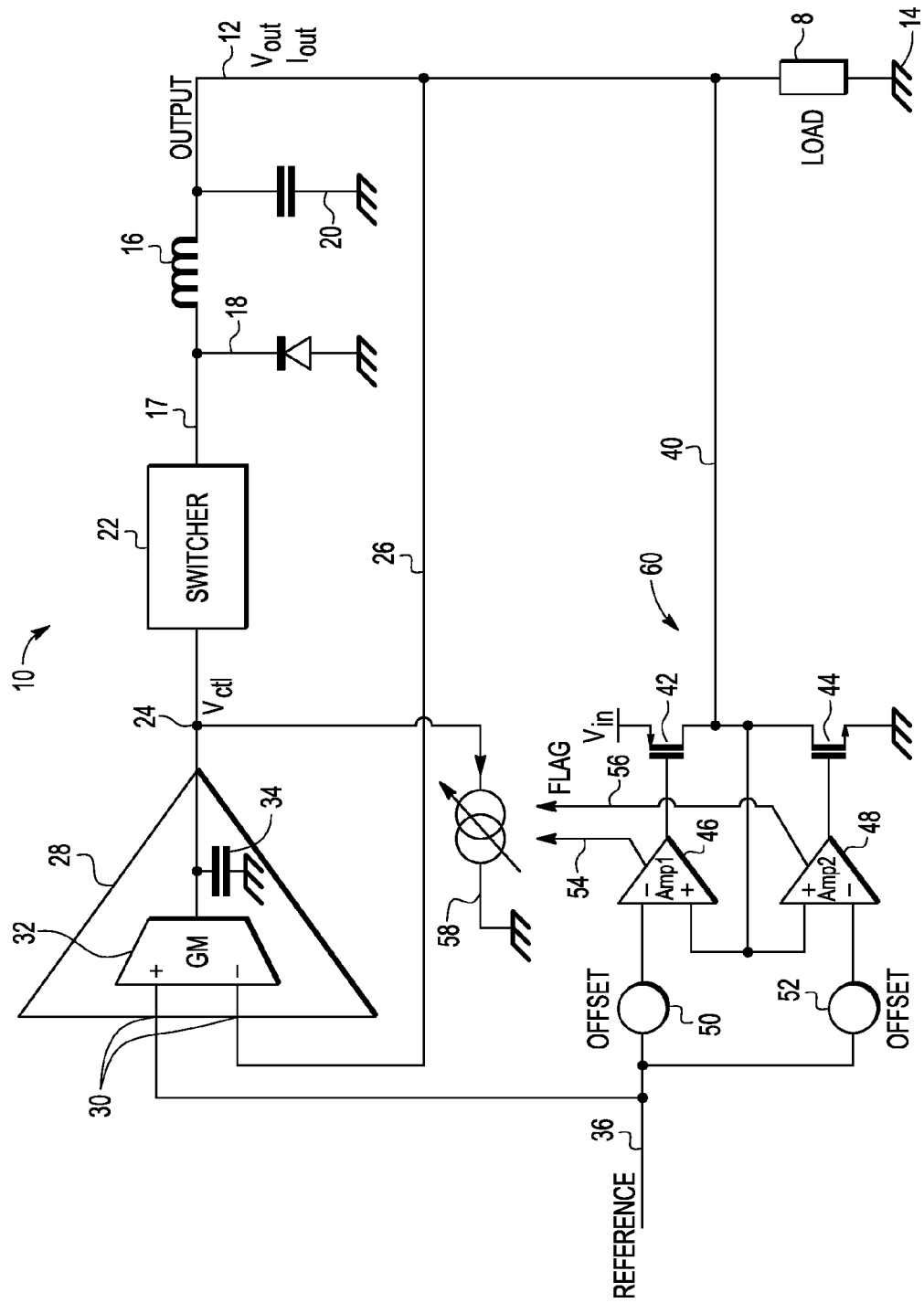
FIG. 1 schematically shows an example of an embodiment of a buck converter.

The buck converter 10 shown in FIG. 1 may have an output node 12 and a ground node 14. A load 8 may be connected between the output node 12 and the ground node 14. The buck converter 10 may be arranged to drive an output current I_out through the output node 12, thereby generating an output voltage in the output node 12. The output voltage in the output node 12 may generally be higher than a ground voltage V_gnd, i.e., the voltage level V_gnd at the ground node 14. The buck converter 10 may thus be operated to power the load 8. It is noted that the ground node is not necessarily connected to any physical ground but may be any kind of node arranged to provide a voltage level (ground voltage level) lower than, e.g., a supply voltage level. The buck converter 10 may further comprise a current control unit 16, 18, 20, 22 and a voltage control unit 26, 58, 60.

The current control unit 16, 18, 20, 22 may, for example, comprise an inner feedback loop for controlling the output current I_out. The voltage control unit 26, 58, 60 may provide an outer feedback loop. More specifically, the current control unit 16, 18, 20, 22 may be arranged to control the output current I_out in dependence on a control voltage V_ctl provided at a control node 24. The dependence may be monotonic. I.e., the output current I_out thus produced may be a monotonic function of the control voltage V_ctl.

The current control unit 16, 18, 20, 22 may, for example, comprise an inductor 16, a diode 18, a capacitor 20, and a switcher unit 22. The switcher unit 22 may have an output 17 connected to the inductor 16 and may be arranged to provide a low voltage level, e.g., the ground voltage level V_gnd, and a high voltage level, e.g., a supply voltage level Vin, in an alternating manner. In other words, the switcher unit 22 may be arranged to provide at its output 17 a sequence of high voltage pulses. The switcher unit 22 may further be arranged to adapt the width of these high voltage pulses in dependence on the current I_out through the inductor 16 and the control voltage V_ctl at the control node 24, thereby regulating the current I_out through the inductor 16 in dependence on the control voltage V_ctl.

The diode 18 and the capacitor 20 may be connected to the inductor 16 so as to allow a current I_out to flow through the inductor 16 when the switcher unit 22 is providing the low voltage level. Ideally, the diode 18 may be omitted. This would require the switcher unit 22 to provide both the high voltage level and the low voltage level sufficiently accurately, with sufficiently accurate timings, which may be costly to implement. The diode 18, in contrast, provides the low voltage level in a simple and cost effective manner.

In a variant of the shown buck converter, the high voltage level is higher than the ground voltage level V_gnd (as in the shown example) and the low-voltage level is lower than the ground voltage level V_gnd. Even in this case the diode 18 or a similar component may be useful to avoid negative voltage spikes on node 17.

It is noted that the diode 18 is not necessarily implemented as a distinct component, but may be integrated in, e.g., a device connected between the node 17 and ground inside the switcher unit 22.

The voltage control unit 26, 58, 60 may be arranged to provide the control voltage V_ctl at the control node 24 and to control the control voltage in (e.g., monotonic) dependence on a difference between the output voltage V_out and a reference voltage V_ref. The reference voltage may, for example, be provided at a reference input 36. The voltage control unit 26, 58, 60 may comprise an integrator unit 28 and a current source 58. The integrator unit 28 may be arranged to provide the control voltage at the control node 24 in (e.g., monotonic) dependence on a time integral of the difference voltage V_out−V_ref. The control voltage provided at the control node 24 for controlling the current control unit 16, 18, 20, 22 may thus be a time average of, e.g., the output voltage V_out minus the reference voltage V_ref. The period over which the difference between the output voltage V_out and the reference voltage V_ref is averaged may, for example, be longer than a switching cycle of the switcher unit 22.

The current source 58 may be connected to the control node 24 and arranged to push or pull a current into or from the control node 24 in dependence on said difference voltage, that is the difference V_out−V_ref between the output voltage V_out at, e.g., the output node 12 and the reference voltage V_ref at, e.g., the reference input 36. The current source 58 may thus adjust the control voltage at the control node 24 quasi instantaneously or at least more rapidly than the integrator unit 28 when the difference voltage changes, e.g., in the event of an overshoot or undershoot of the output voltage V_out. The combination of the integrator unit 28 and the current source 58 may thus constitute a voltage control unit capable of handling both slow and fast variations of the output voltage level.

The integrator unit 28 may be operable in a continuous manner. The current source 58 on the other hand is not necessarily operable in a continuous manner because pulling a current from the control node 24 or pushing a current into the control node 24 may produce a saturation effect determined by, e.g., an internal capacitance of the circuitry connected to the control node 24. This internal capacitance is represented in FIG. 1 schematically as an internal capacitance C_int of the integrator unit 28. This internal capacitance may, for example, be provided by a capacitor 34 connected between, e.g., the control node 24 and the ground node 14, or be equivalent thereto.

The buck converter 10 may further comprise a push unit 42, 46 or a pull unit 44, 48 or both. The push unit 42, 46 may be arranged to push a current to the output node 12 in response to the output voltage undershooting the reference voltage. The pull unit 44, 48 may be arranged to pull a current from the output node 12 in response to the output voltage overshooting the reference voltage. The push unit 42, 46 and the pull unit 44, 48 may represent the principal means for handling undershoots and overshoots of the output voltage V_out. The current source 58 may represent a further improvement of the overshoot and undershoot handling capability of the buck converter 10. In other words, the current source 58 may be most beneficial when implemented in conjunction with the push unit 42, 46 or the pull unit 44, 48 or both. It is, however, pointed out that the current source 58, arranged to push or pull a current into or from the control node 24 in dependence on the difference voltage may alleviate the problem of voltage overshoots or undershoots even when the buck converter 10 lacks the push unit 42, 46 or the pull unit 44, 48 or similar current handling circuitry connected to the output node 12.

The push unit 42, 46 and the pull unit 44, 48 may, for instance, be implemented as follows. The push unit 42, 46 may comprise a switch 42 arranged to connect the output node 12 to a high voltage node in response to the output voltage V_out undershooting an undershoot threshold voltage. The pull unit 44, 48 may comprise a switch 44 arranged to connect the output node 12 to a low voltage node in response to the output voltage overshooting an overshoot threshold voltage. The high voltage node may, for instance, be arranged to provide a supply voltage level Vin whereas the low voltage node may, e.g., be the ground node 14. In the shown example, the first switch 42 is a PMOS field effect transistor (FET) having a source connected to the high voltage node and a drain connected to the output node 12. The switch 44 may, for example, be a NMOS field effect transistor having a source connected to the low voltage node, e.g., the ground node 14, and a drain connected to the output node 12. The switches 42 and 44 may thus be turned on and off in dependence on the respective gate source voltage.

The push unit 42, 46 may further comprise, e.g., an amplifier 46 having an output connected to a control input of the switch 42. In the present example, the control input of the switch 42 is the gate of the PMOS FET 42. The amplifier 46 may have a first input (−) connected to the reference node 36 and a second input (+) connected to the control node 12. The first input (−) of the amplifier 46 may be connected to the reference node 36 via an offset unit 50. The offset unit 50 may be arranged to produce an offset voltage V_offset_1 between its input connected to, e.g., the reference node 36 and its output connected to the first input (−) of the amplifier 46. The offset voltage of the offset unit 50 may be chosen so as to set the undershoot threshold voltage to a desired value. The amplifier 46 may have a gain γ1. The amplifier 46 may thus produce a switch control voltage V_g1 for the switch 42 that may be proportional to the output voltage V_out minus the reference voltage V_ref minus the offset voltage V_offset_1:

$$V\_g1=\gamma 1*(V\_out-V\_ref-V\_offset\_1).$$

The pull unit 44, 48 may similarly comprise an amplifier 48 having an output connected to a control input of the second switch 44, a first input (−) connected to, e.g., the reference node 36, and a second input (+) connected to the control node 12. The first input of the amplifier 48 may be connected to the reference node 36 via an offset unit 52 for producing an offset voltage V_offset_2 between its input and its output. The amplifier 48 may thus produce a switch control voltage V_g2 for the switch 44 that may vary in proportion to the output voltage:

$$V\_g2=\gamma 2*(V\_out-V\_ref-V\_offset\_2)$$

wherein γ2 is the gain of the amplifier 48.

In the shown example, the switches 42 and 44 may be connected to the output node 12 via a common line 40. In the event of an undershoot, the switch 42 may turn on while the switch 44 may remain off. As a consequence, the switch 42 may push a current through the line 40 to the output node 12, thereby counteracting the undershoot. In the event of an overshoot, however, the switch 44 may turn on while the switch 42 may remain off. As a consequence, the switch 44 may pull a current from the output node 12, thereby counteracting the overshoot.

The buck converter 10 may comprise an overshoot detector and an undershoot detector for controlling the current source 58. In the shown example, the undershoot detector may be provided by the amplifier 46. The overshoot detector may be provided by the amplifier 48.

The amplifier 46 may be arranged to provide a flag 54 for signalling whether the differential input voltage applied at the amplifier 46 is positive. The flag 54 may, for instance, have the possible values of 0 and 1, the value of 0 indicating that the differential input voltage at the amplifier 46 is negative and the value of 1 indicating that the differential input voltage at the amplifier 46 is positive.

The amplifier 48 may similarly provide a flag 56 for indicating whether the differential input voltage at the amplifier 48 is positive. The flag 56 may, for instance, be 0 when the differential input voltage at the amplifier 48 is negative and 1 when the differential input voltage at the amplifier 48 is positive.

The current source 58 may be arranged to pull a positive current from the control node 24 in response to the flag 54 being 1 and to push a current of, e.g., the same absolute amplitude as in the overshoot situation, to the control node 24 in response to the flag 56 being 1. The current source 58 may thus be controlled to shift the operating point of the integrator unit 28 in dependence on whether there is an overshoot of the output voltage V_out, an undershoot, or neither an overshoot nor an undershoot.

In the case of an overvoltage, the current I generated by the current source 58 may, for example, have a constant amplitude of I_pull=C_int*(V_out−V_gnd)/L wherein C_int is the capacity of the internal capacitor 34, L is the inductivity of the inductor 16, and wherein it has been assumed that the switcher unit 22 has a voltage-to-current ratio of 1, that is the ratio of a steady-state current I_out through the inductor 16 and the control voltage V_ctl at the control node 24. More generally, now considering that voltage-to-current ratio of the switcher unit 22 is α, the current I generated by the current source 58 may have the amplitude I_push=C_int*(V_out−V_gnd)/L/α. It is observed that in an overvoltage situation, the current I_out through the inductor 16 may decrease with a slope dl_out/dt=(V_out−V_gnd)/L. Pulling a current of magnitude I=I_push as defined above from the control node 24 may thus lower the control voltage at the control node 24, i.e. the voltage across the capacitor 34, in accordance with the fastest possible decrease dl_out/dt of the current I_out through the inductor 16.

In the case of an undervoltage, the current source 58 may be controlled to produce a constant current I_push=−C_int*(V_in−V_out)/L/α. As a consequence, the current I_out through the inductor 16 may increase with its highest possible rate of change dl_out/dt. In practice, the above defined magnitudes of the current generated by the current source 58 may be satisfied to a varying degree of precision. For instance, the generated current may differ from the above-defined optimum values by up to 10%, 20% or even 30%.

In the shown example, the integrator unit 28 may, for instance, comprise an amplifier 32. The amplifier 32 may have a differential input 30 connected to the output node 12 and the reference node 36, and an output connected to the control node 24 and the capacitive element 34. The amplifier 32 may be arranged to output a current in proportion to the differential voltage applied at its differential input 30. The element 32 may thus charge and decharge the capacitive element 34 in proportion to the difference between the output voltage V_out and the reference voltage V_ref, thus producing an average voltage across the capacitive element 34 that may be indicative of the difference between the output voltage V_out and the reference voltage V_ref averaged over a time related to, e.g., the charging and decharging times of the capacitor 34. The current source 58 may modify this voltage across the capacitor 34, i.e. the voltage at the control node 24, so as to enable the switcher unit 22 to respond more rapidly to an overshoot or undershoot of the output voltage V_out. The amplifier 32 may, for instance, be an Operational Transconductance Amplifier (OTA).

Figure 2:
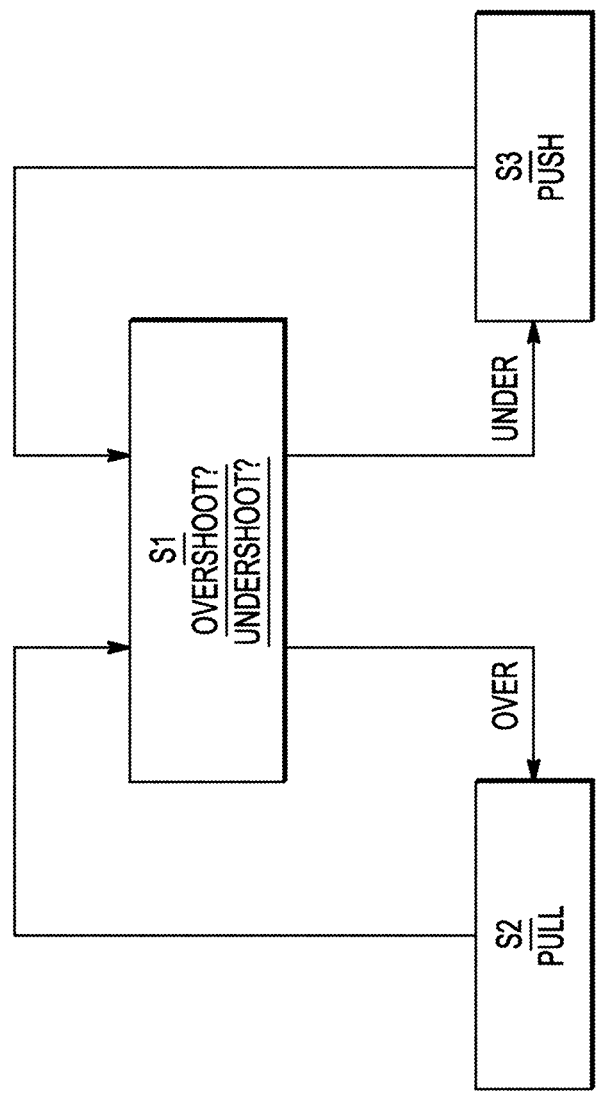
FIG. 2 shows a flow chart of an example of an embodiment of a method of operating a buck converter.

Turning now to FIG. 2, a method of operating a buck converter 10 is described. The buck converter 10 may be of the kind described above in reference to FIG. 1. Notably, the buck converter 10 may have an output node 12 and a ground node 14. A load 8 may be connected between the output node 12 and the ground node 14 and the buck converter 10 may be operated to drive an output current I_out through the output node 12, thereby generating an output voltage V_out in the output node 12. The method may comprise: providing a control voltage V_ctl at a control node 24; controlling the output current I_out in dependence on the control voltage V_ctl; controlling the control voltage V_ctl in dependence on a time integral of a difference between the output voltage V_out and a reference voltage V_ref; detecting an overshoot or an undershoot of the output voltage V_out; and pulling a current of amplitude I_pull from the control node 24 in response to detecting the overshoot and pushing a current of amplitude I_push to the control node 24 in response to detecting the undershoot.

For example, the method may comprise determining whether there is an overshoot or an undershoot of the output voltage (block S1). In the event of an overshoot, a current may be pulled from the control node 24. The current may, for instance, be pulled by means of a current source. The pulled current may notably be constant as long as the overshoot situation is found to persist. The current may, for instance, have the amplitude I_pull=C_int*(V_out−V_gnd)/L/α. In the event of an undershoot, a current may be pushed to the control node 24. The pushed current may, for instance, have an amplitude of I_push=−C_int*(V_in−V_out)/L/α. The pushed current may thus be constant, e.g., as long as the undershoot situation is found to persist.

Figure 3:
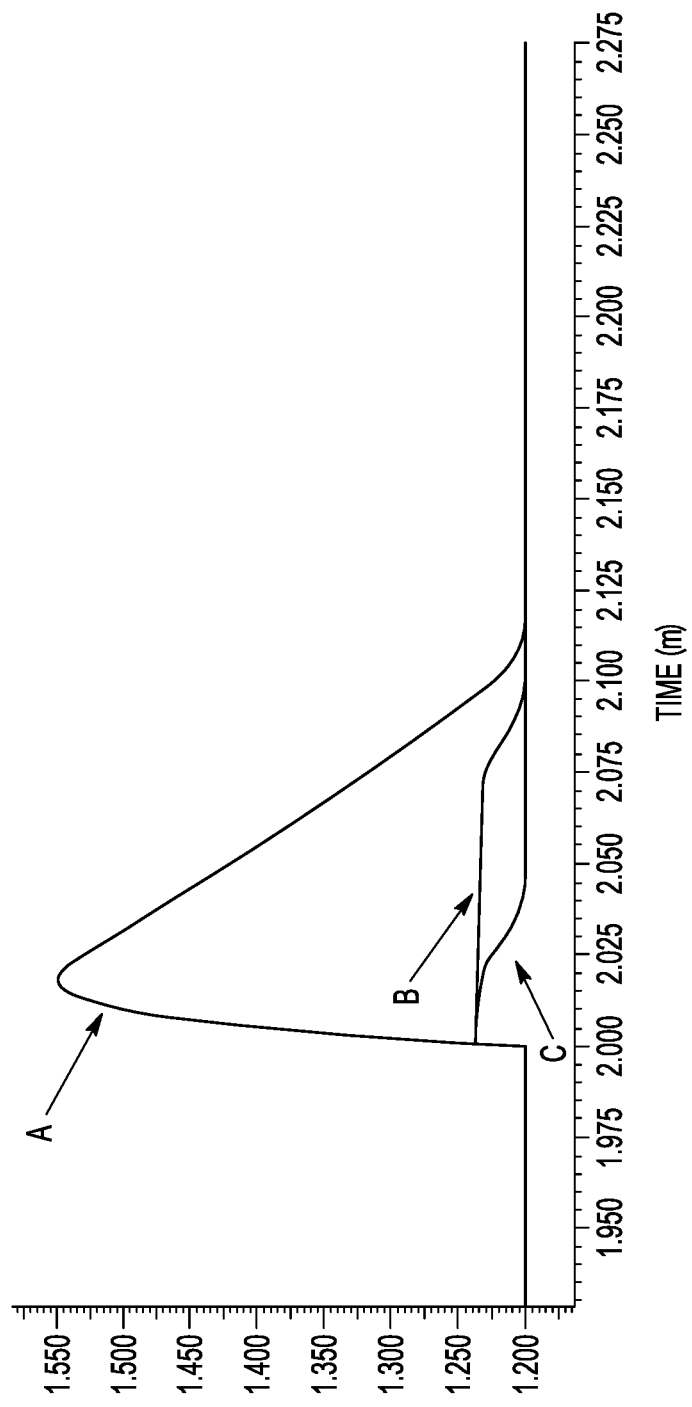
FIG. 3 shows a diagram illustrating a voltage overshoot for three different kinds of buck converters.

FIG. 3 shows a diagram of the output voltage V_out for three variants A, B and C of the buck converter 10 described above in reference to FIGS. 1 and 2, as functions of time in the event of a sudden increase of the resistance of the load 8 at time t=2.000 or in the event of abruptly disconnecting the load 8. Graph A relates to an example of a buck converter which differs from the one shown in FIG. 1 in that it lacks both the push pull circuitry 40, 60 and the current source 58. Graph B relates to an example of a buck converter which differs from the one shown in FIG. 1 in that it lacks the current source 58. Graph C relates to an example of the buck converter 10 shown in FIG. 1. In each of the considered variants A, B, and C, the load change results in an overshoot of the output voltage at t=2.000. However, the push pull circuitry 40, 60 is seen to reduce the amplitude of the overshoot by a factor of about six. The current source 58 introduced in variant C is further seen to reduce the duration of the overshoot condition by a factor of about three.

In the foregoing specification, the invention has been described with reference to specific examples of embodiments of the invention. It will, however, be evident that various modifications and changes may be made therein without departing from the broader spirit and scope of the invention as set forth in the appended claims.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Also, for example, in one embodiment, the illustrated examples may be implemented as circuitry located on a single integrated circuit (IC) or within a same device. For example, the buck converter 10 and the load 8 may be located on a single IC. Alternatively, the examples may be implemented as any number of separate integrated circuits or separate devices interconnected with each other in a suitable manner. For example, the buck converter 10 may be formed as a device separate from but connectable to the load 8.

Also, for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A buck converter having an output node and a ground node, wherein a load is connected or connectable between the output node and the ground node and the buck converter is arranged to drive an output current I_out through the output node, thereby generating an output voltage V_out in the output node; the buck converter comprises:

a current control unit arranged to control the output current I_out in dependence on a control voltage V_ctl provided at a control node; and a voltage control unit arranged to provide the control voltage V_ctl and comprising:

an integrator unit arranged to control the control voltage V_ctl in dependence on a time integral of a difference between the output voltage V_out and a reference voltage V_ref;

at least one of an overshoot detector arranged to detect an overshoot of the output voltage V_out, and an undershoot detector arranged to detect an undershoot of the output voltage V_out; and a current source connected to the control node and arranged to pull a current of amplitude I_pull from the control node in response to the overshoot detector detecting an overshoot of the output voltage V_out, or arranged to push a current of amplitude I_push to the control node in response to the undershoot detector detecting an undershoot of the output voltage V_out, or both, wherein $$I\_pull = C\_int*(V\_out - V\_gnd)/L/\alpha \text{ and/or}$$

$$I\_push = -C\_int*(V\_in - V\_out)/L/\alpha$$

wherein $\alpha$ is a voltage-to-current ratio of a switcher unit of the current control unit, V_in is a supply voltage, V_gnd is a ground voltage, L is an internal inductance of the current control unit, and C_int is an internal capacitance of the integrator unit.

2. The buck converter of claim 1, comprising at least one of:

a push unit arranged to push a current to the output node in response to the output voltage undershooting the reference voltage; and/or a pull unit arranged to pull a current from the output node in response to the output voltage overshooting the reference voltage.

3. The buck converter of claim 2, wherein the overshoot detector is provided by the pull unit, and/or wherein the undershoot detector is provided by the push unit.

4. The buck converter of claim 2, wherein the push unit comprises a switch arranged to connect the output node to a high voltage node in response to the output voltage undershooting an undershoot threshold voltage; and/or the pull unit comprises a switch arranged to connect the output node to a low voltage node in response to the output voltage overshooting an overshoot threshold voltage.

5. The buck converter of claim 4, wherein the switch of the push unit is a PMOS field effect transistor having a source connected to the high voltage node, a drain connected to the output node, and a gate, and wherein the pull unit comprises an amplifier having a differential input connected to the reference node and the output node and an output connected to the gate of the PMOS field effect transistor, and the switch of the pull unit is a NMOS field effect transistor having a source connected to the low voltage node, a drain connected to the output node, and a gate, and wherein the pull unit comprises an amplifier having a differential input connected to the reference node and the output node and an output connected to the gate of the NMOS field effect transistor.

6. The buck converter of claim 5, wherein
the amplifier of the push unit is arranged to provide an undershoot detection signal indicating whether the output voltage is lower than the undershoot threshold voltage, and
the amplifier of the pull unit is arranged to provide an overshoot detection signal indicating whether the output voltage is higher than the overshoot threshold voltage.

7. The buck converter of claim 6, wherein
the current source is arranged to perform said action of pushing a current to the control node in response to the undershoot signal indicating that the output voltage is lower than the undershoot threshold voltage, and
the current source is arranged to perform said action of pulling a current from the control node in response to the overshoot signal indicating that the output voltage is higher than the overshoot threshold voltage.

8. A method of operating a buck converter, the buck converter having an output node and a ground node, wherein a load is connected between the output node and the ground node and the buck converter is arranged to drive an output current I_out through the output node, thereby generating an output voltage V_out in the output node; the method comprises:
providing a control voltage V_ctl at a control node;
controlling the output current I_out in dependence on the control voltage V_ctl;
controlling the control voltage V_ctl in dependence on a time integral of a difference between the output voltage V_out and a reference voltage V_ref;
detecting an overshoot or an undershoot of the output voltage V_out; and
pulling a current of amplitude I_pull from the control node in response to detecting the overshoot and pushing a current of amplitude I_push to the control node in response to detecting the undershoot, wherein $$I\_pull=C\_int*(V\_out-V\_gnd)/L/\alpha \text{ and/or}$$

$$I\_push=-C\_int*(V\_in-V\_out)/L/\alpha$$

wherein $\alpha$ is a voltage-to-current ratio of a switcher unit of the current control unit, V_in is a supply voltage, V_gnd is a ground voltage, L is an internal inductance of the current control unit, and C_int is an internal capacitance of the integrator unit.

9. A buck converter having an output node and a ground node, wherein a load is connected or connectable between the output node and the ground node and the buck converter is arranged to drive an output current I_out through the output node, thereby generating an output voltage V_out in the output node; the buck converter comprises:
a current control unit arranged to control the output current I_out in dependence on a control voltage V_ctl provided at a control node; and
a voltage control unit arranged to provide the control voltage V_ctl and comprising:
an integrator unit arranged to control the control voltage V_ctl in dependence on a time integral of a difference between the output voltage V_out and a reference voltage V_ref;
an overshoot detector arranged to detect an overshoot of the output voltage V_out; and
a current source connected to the control node and arranged to pull a current of amplitude I_pull from the control node in response to the overshoot detector detecting an overshoot of the output voltage V_out.

10. The buck converter of claim 9, wherein:

$$I\_pull=C\_int*(V\_out-V\_gnd)/L/\alpha$$

wherein $\alpha$ is a voltage-to-current ratio of a switcher unit of the current control unit, V_in is a supply voltage, V_gnd is a ground voltage, L is an internal inductance of the current control unit, and C_int is an internal capacitance of the integrator unit.

11. The buck converter of claim 9, comprising a pull unit arranged to pull a current from the output node in response to the output voltage overshooting the reference voltage.

12. The buck converter of claim 11, wherein the overshoot detector is provided by the pull unit.

13. The buck converter of claim 11, wherein the pull unit comprises a switch arranged to connect the output node to a low voltage node in response to the output voltage overshooting an overshoot threshold voltage.

14. The buck converter of claim 11, wherein the pull unit is arranged to provide an overshoot detection signal indicating that the output voltage is higher than the overshoot threshold voltage, and the current source is arranged to pull a current from the control node in response to the overshoot signal indicating that the output voltage is higher than the overshoot threshold voltage.

15. The buck converter of claim 9, further comprising:
an undershoot detector arranged to detect an undershoot of the output voltage V_out, wherein the current source is further arranged to push a current of amplitude I_push to the control node in response to the undershoot detector detecting an undershoot of the output voltage V_out.

16. The buck converter of claim 15, wherein:

$$I\_push=-C\_int*(V\_in-V\_out)/L/\alpha$$

wherein $\alpha$ is a voltage-to-current ratio of a switcher unit of the current control unit, V_in is a supply voltage, V_gnd is a ground voltage, L is an internal inductance of the current control unit, and C_int is an internal capacitance of the integrator unit.

17. The buck converter of claim 15, further comprising a push unit arranged to push a current to the output node in response to the output voltage undershooting the reference voltage.

18. The buck converter of claim 17, wherein the undershoot detector is provided by the push unit.

19. The buck converter of claim 17, wherein the push unit comprises a switch arranged to connect the output node to a high voltage node in response to the output voltage undershooting an undershoot threshold voltage.

20. The buck converter of claim 19, wherein the pull unit is arranged to provide an undershoot detection signal indicating that the output voltage is lower than the undershoot threshold voltage, and the current source is arranged to push a current to the control node in response to the undershoot signal indicating that the output voltage is lower than the undershoot threshold voltage.

* * * * *